United States Patent [19]
Deng et al.

[11] Patent Number: 6,047,787
[45] Date of Patent: Apr. 11, 2000

[54] VOLTAGE CONTROL METHOD FOR AN ELECTRIC MOTOR CONTROL SYSTEM

[75] Inventors: Doug D. Deng, Canton; Christos Aristotles Kambouris, Northville; Kent Michael Harmon, Troy, all of Mich.

[73] Assignee: Ecostar Electric Drive Systems LLC, Dearborn, Mich.

[21] Appl. No.: 09/017,934

[22] Filed: Feb. 3, 1998

[51] Int. Cl.⁷ ........................................ B60K 1/00
[52] U.S. Cl. ...................... 180/165; 180/65.3; 180/65.8; 290/16
[58] Field of Search .................... 180/165, 65.1, 180/65.2, 65.3, 65.4, 65.6, 65.7, 65.8; 318/139, 140, 141; 290/9, 10, 11, 14, 16, 17, 45; 477/2, 3, 4

[56] References Cited

U.S. PATENT DOCUMENTS

| | | |
|---|---|---|
| 3,732,751 | 5/1973 | Borman et al. .......................... 180/65.1 |
| 3,904,947 | 9/1975 | Creuz ...................................... 318/139 |
| 3,989,990 | 11/1976 | Thompson . |
| 4,093,900 | 6/1978 | Plunkett . |
| 4,371,824 | 2/1983 | Gritter . |
| 4,423,362 | 12/1983 | Konrad et al. . |
| 4,538,100 | 8/1985 | Tuten et al. . |
| 4,672,524 | 6/1987 | Toriyama et al. . |
| 4,862,343 | 8/1989 | Nomura et al. . |
| 5,063,532 | 11/1991 | Takeda et al. . |
| 5,065,304 | 11/1991 | Tamai et al. . |
| 5,698,905 | 12/1997 | Ruthlein et al. .......................... 290/45 |

*Primary Examiner*—Richard M. Camby
*Attorney, Agent, or Firm*—Mark S. Sparschu

[57] ABSTRACT

A method for controlling regenerative energy in a system having an motor and having a power converter for converting regenerative energy from the motor for supply as electrical current to a receiving apparatus includes estimating a resistance to electrical current flow between the electrical power converter and the receiving apparatus and measuring a first voltage at the receiving apparatus. The method further comprises controlling a regenerative current from the power converter to the receiving apparatus in view of the resistance and the first voltage to limit a second voltage at the power converter.

12 Claims, 2 Drawing Sheets

VOLTAGE CONTROL METHOD FOR AN ELECTRIC MOTOR CONTROL SYSTEM

BACKGROUND OF THE INVENTION

1. Field of the Invention

The present invention relates generally to electric motor control systems and more specifically to a voltage control method for use within an electric motor control system.

2. Description of the Related Art

In an electric motor control system such as, for example, that used in an electrically-propelled vehicle, an electric power converter typically converts electric energy between an electrical energy storage medium and the motor. In an electrically-propelled vehicle, the storage medium is generally a battery. The electric power converter converts the form of electric energy available in the storage medium (for example, direct current energy in a battery) into electric energy which can be used by the motor (for example, three-phase electrical power for use by a three-phase motor)

In order to prevent wasting energy in an electric motor control system, regeneration energy from the motor can be captured while the motor is decelerating. Such regeneration energy is generated by the motor and is converted by the electric power converter back into the form which can be stored by the storage medium.

However, an issue arises in providing regeneration energy back to the storage medium. Because an electric power converter typically comprises semiconductor switches, there is a voltage limit above which these switches should not be exposed. As with all semiconductor devices, the switches in an electric power converter can be damaged by overvoltage. As regeneration current is provided from the power converter to the storage medium, the terminal voltage at the power converter rises above the voltage of the storage medium. This is due to the I•R voltage across the bus connecting the power converter and the storage medium. Should the terminal voltage at the power converter rise such that the semiconductor switches within the power converter are exposed to an overvoltage condition, those switches can be damaged.

One proposed method for preventing the terminal voltage of an electrical power converter from excessively rising during a regenerative event is to simply measure and closed-loop-control the terminal voltage of the electrical power converter. That is, the terminal voltage is periodically measured and the regeneration current is reduced if necessary to prevent the terminal voltage from rising above a predetermined acceptable value.

However, such a method has drawbacks. In a control system which uses the terminal voltage at the power converter as the control variable, some amount of overshoot of that voltage is the price paid for acceptable speed of performance. This is a trade-off faced in any control system. Such overshoot could over time damage the semiconductor switches within the electric power converter. The overshooting can be tolerated if the target point for control of the terminal voltage of the electric power converter is reduced. However, this will also reduce the amount of available energy which is captured through regeneration.

Thus, a system and method which allow for very high efficiency in recapturing regeneration energy and which effectively protect the electric power converter from damage due to overvoltage will provide advantages over alternative systems.

SUMMARY OF THE INVENTION

The present invention provides a method for controlling regenerative energy in a system having an motor and having a power converter for converting regenerative energy from the motor for supply as electrical current to a receiving apparatus. The method comprises estimating a resistance to electrical current flow between the electrical power converter and the receiving apparatus and measuring a first voltage at the receiving apparatus. The method further comprises controlling a regenerative current from the power converter to the receiving apparatus in view of the resistance and the first voltage to limit a second voltage at the power converter.

The present invention can effectively prevent overvoltage within an electric power converter while allowing regeneration energy to be captured with high efficiency. In doing so, the present invention provides considerable advantages over alternative technologies.

DETAILED DESCRIPTION OF THE PREFERRED EMBODIMENT

Figure 1:
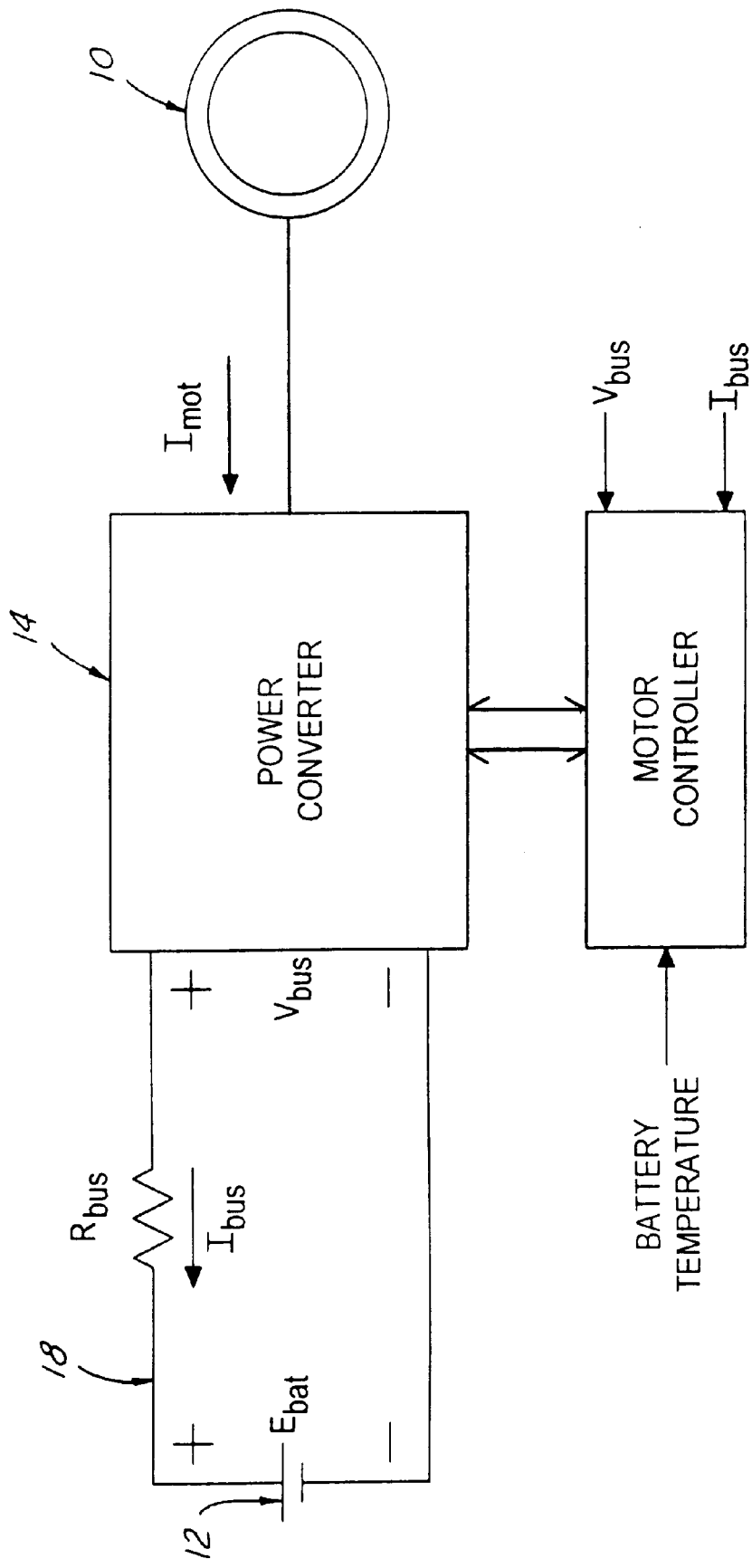
FIG. 1 is a block diagram of a drive system for an electric vehicle.

Refer first to FIG. 1. There, a drive system for a typical electric vehicle is illustrated. The system includes a motor 10, which may be an AC or DC motor. The system also includes a source of electrical energy such as a battery 12. A power converter 14 converts the energy provided by battery 12 into a usable form for motor 10. For example, if motor 10 is a three-phase AC motor, power converter 14 will be a three-phase DC-to-AC inverter. A motor controller 16 controls power converter 14. For example, controller 16 controls the semiconductor switches which would convert the EC energy from battery 12 into three-phase AC energy for motor 10. Controller 16 is preferably a microprocessor-based device which uses any known motor control algorithm which is appropriate for the specific motor 10 employed in the system. When power converter 14 provides electrical current to motor 10, motor 10 produces mechanical torque for propelling the electric vehicle.

When current flows from motor 10 to power converter 14, however, motor 10 is operating in regenerative mode. This is the direction of current flow designated by the label "$I_{mot}$" in FIG. 1. In regenerative mode, kinetic energy from the vehicle's motion drives motor 10 as a generator. Controller 16 controls power converter 14 to provide at least a portion of the regenerative energy to battery 12. Charging battery 12 with regenerative energy helps to extend the range of the electric vehicle.

Battery 12 and power converter 14 are electrically coupled by a bus 18 which conducts electrical energy between battery 12 and power converter 14. At power converter 14, the voltage across bus 18 is denoted $V_{bus}$. At battery 12, the no-load terminal voltage of battery 12 is denoted $E_{bat}$. The total resistance of bus 18 is denoted $R_{bus}$. $R_{bus}$ includes all electrical resistance to current flow between battery 12 and power converter 14. This includes conductor resistance, resistance of any electrical couplings in bus 18 and the internal resistance of battery 12. Current flowing from power converter 14 to battery 12 during regeneration is denoted $I_{bus}$.

Motor controller 16 has several inputs as shown in FIG. 1. $V_{bus}$ and $I_{bus}$ are provided through appropriate sensing means. Also, the temperature of battery 12 is sensed by an appropriate sensor located within or near battery 12. Alternatively, ambient temperature or other surrogates for battery temperature may be available. Also, other inputs to motor controller 16 may be used for the general purpose of motor control; such inputs are not detailed here for the sake of simplicity.

Power converter 14 typically contains electronic devices such as semiconductor switches. Those semiconductor switches may be, for example, field-effect transistors (FETs) or bipolar junction transistors (BJTs). Such devices have upper voltage thresholds above which they should not be exposed without damage to the devices. Thus, in the terminology of FIG. 1, $V_{bus}$ should be limited to an acceptable level.

In a method of limiting $V_{bus}$ to an acceptable level according to this embodiment of the present invention, it is recognized that $V_{bus}$ is equal to $E_{bat}$ plus the I•R drop across $R_{bus}$. Thus, knowing $E_{bat}$ and knowing $R_{bat}$ (which can be estimated as will be described herein), a limit can be calculated for $I_{bus}$ such that the threshold for acceptable $V_{bus}$ is not exceeded. Controller 16 can then limit $I_{bus}$ accordingly.

Figure 2:
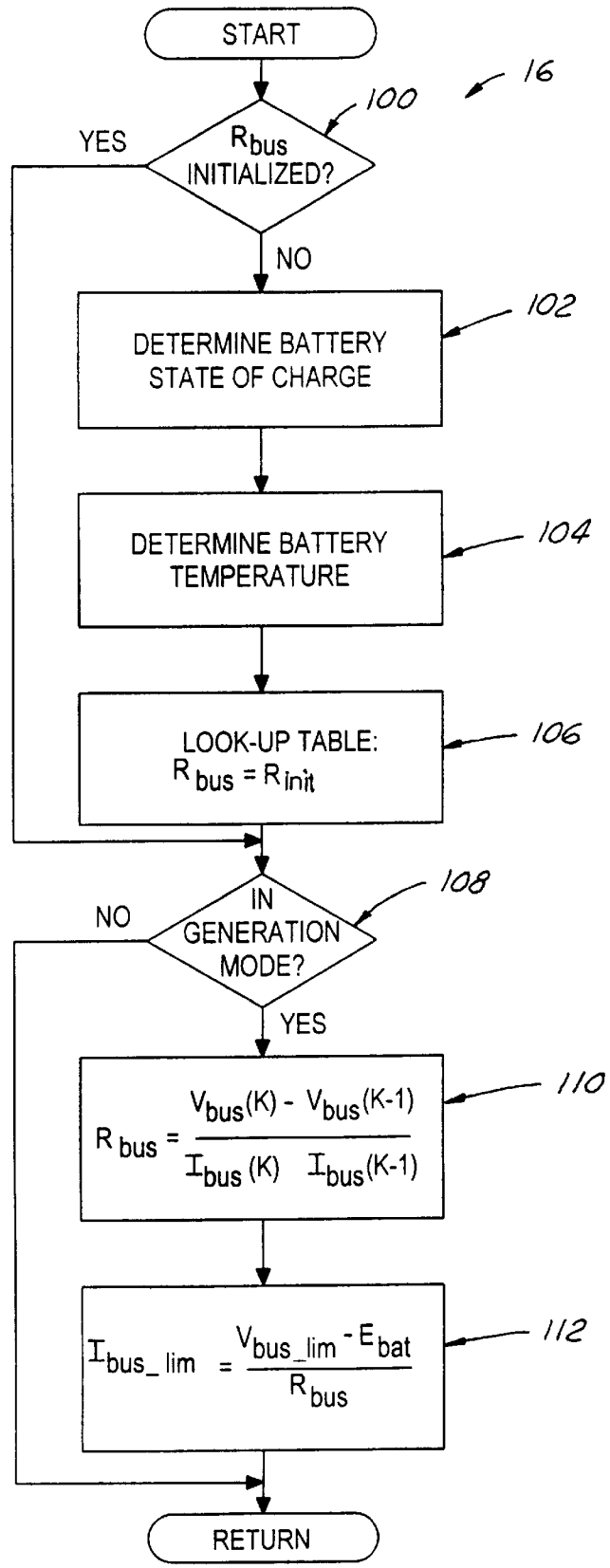
FIG. 2 illustrates a control method performed by motor controller 16 of FIG. 1 to limit the voltage $V_{bus}$ at power converter 14.

Refer additionally to FIG. 2 for a detailed description of how controller 16 limits $V_{bus}$ according to this embodiment of the present invention. At block 100, controller 16 determines whether its estimate of $R_{bus}$ has been initialized. If YES, $R_{bus}$ is not initialized again. If NO, $R_{bus}$ is initialized at blocks 102, 104 and 106. At block 102, the state of charge of battery 12 is determined. The state of charge of battery 12 can be estimated by an ongoing integration of the current flowing into and out of battery 12. Alternatively or additionally, several state-of-charge estimation algorithms are known to those having skill in the art. At block 104, the temperature of battery 14 (or an appropriate surrogate for battery temperature) is examined. At step 106, then, the value of $R_{bus}$ is set to an initialization value $R_{init}$. $R_{init}$ is preferably looked up from a three-dimensional look-up table having the temperature and state of charge (SOC) of battery 12 as independent variables. Battery internal resistance is the dependent variable, and its relationship to battery temperature and SOC are known a priori with reasonable accuracy.

Using battery internal resistance as the initial bus resistance estimate $R_{init}$ assumes that the internal resistance of battery 12 dominates over conductor resistance and connector resistance in comprising $R_{bus}$. This is the normal case and is a reasonable starting point for the estimate of $R_{bus}$. However, connector resistance may increase over time with the effects of corrosion and of loosening connectors. Also, the battery internal resistance value looked up at step 106 may have inaccuracies. Thus, an ongoing calculation of $R_{bus}$ is then made, in order to improve the accuracy of the initial estimate.

At step 108, it is determined whether motor 10 is operating in regenerative mode. This, of course, is information known to motor controller 16. If motor 10 is operating in regenerative mode, an ongoing calculation of $R_{bus}$ occurs at step 110. Periodic samples of $V_{bus}$ and $I_{bus}$ are taken by controller 16 and are used to estimate $R_{bus}$. Specifically, $R_{bus}$ can be estimated as:

$$R_{bus} = \frac{V_{bus}(k) - V_{bus}(k-1)}{I_{bus}(k) - I_{bus}(k-1)},$$

where $V_{bus}$ (k) and $V_{bus}$ (k-1) are periodically-measured values of $V_{bus}$ and $I_{bus}$ (k) and $I_{bus}$ (k-1) are periodically-measured values of $I_{bus}$.

At step 112, then, controller 16 calculates a limit $I_{bus\_lim}$ below which controller will limit the regenerative current supplied on bus 18 to battery 12. Recognizing that $$V_{bus}=E_{bat}+I_{bus}R_{bus},$$

$I_{bus\_lim}$ is calculated as follows:

$$I_{bus\_lim} = \frac{V_{bus\_lim} - E_{bat}}{R_{bus}},$$

where $V_{bus\_lim}$ is the predetermined voltage above which $V_{bus}$ should not be allowed to rise. Controller 16 controls the regenerative current provided to battery 12 to not exceed $I_{bus\_lim}$. It should be noted that $E_{bat}$ is not directly measured per se. However, each time the current $I_{bus}$ is insignificantly small, such as when the vehicle is at rest or when the direction of flow of current $I_{bus}$ reverses, $E_{bat}$ is equal to $V_{bat}$. At those times, the value of $E_{bat}$ stored in controller 16 can be updated.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for controlling regenerative energy in an electrically-propelled vehicle having a motor and having a power converter for converting regenerative energy from said motor for supply to a battery, said method comprising the steps of:

(a) estimating a resistance to electrical current flow between said electrical power converter and said battery;

(b) measuring a terminal voltage of said battery;

(c) controlling a regenerative current from said power converter to said battery in view of said resistance and said terminal voltage to limit a voltage at said power converter.

2. A method as recited in claim 1, wherein estimating a resistance to electrical current flow further comprises:

measuring a voltage $V_1$ at said power converter at a first time;

measuring a current $I_1$ between said power converter and said battery at said first time;

measuring a voltage $V_2$ at said power converter at a second time;

measuring a current $I_2$ between said power converter and said battery at said second time; and calculating said resistance as a difference between $V_2$ and $V_1$, divided by a difference between $I_2$ and $I_1$.

3. A method as recited in claim 2, wherein estimating a resistance further comprises employing an initial resistance estimate at an initial time, said initial estimate representing a nominal internal resistance of said battery as a function of a state of charge of said battery at said initial time.

4. A method as recited in claim 2, wherein estimating a resistance further comprises employing an initial resistance estimate at an initial time, said initial estimate representing a nominal internal resistance of said battery as a function of a temperature of said battery at said initial time.

5. A method as recited in claim 2, wherein estimating a resistance further comprises employing an initial resistance estimate at an initial time, said initial estimate representing a nominal internal resistance of said battery as a function of a state of charge and a temperature of said battery at said initial time.

6. A method as recited in claim 1, wherein said step of controlling a regenerative current comprises limiting said regenerative current to maintain said voltage at said power converter below a predetermined threshold.

7. A method as recited in claim 2, wherein said step of controlling a regenerative current comprises limiting said regenerative current to maintain said voltage at said power converter below a predetermined threshold.

8. A method as recited in claim 5, wherein said step of controlling a regenerative current comprises limiting said regenerative current to maintain said voltage at said power converter below a predetermined threshold.

9. A method for controlling regenerative energy in a system having an motor and having a power converter for converting regenerative energy from said motor for supply as electrical current to a receiving apparatus, said method comprising the steps of:

(a) estimating a resistance to electrical current flow between said electrical power converter and said receiving apparatus;

(b) measuring a first voltage at said receiving apparatus;

(c) controlling a regenerative current from said power converter to said receiving apparatus in view of said resistance and said first voltage to limit a second voltage at said power converter.

10. A method as recited in claim 9, wherein estimating a resistance to electrical current flow further comprises:

measuring a voltage $V_1$ at said power converter at a first time;

measuring a current $I_1$ between said power converter and said receiving apparatus at said first time;

measuring a voltage $V_2$ at said power converter at a second time;

measuring a current $I_2$ between said power converter and said receiving apparatus at said second time; and calculating said resistance as a difference between $V_2$ and $V_1$, divided by a difference between $I_2$ and $I_1$.

11. A method as recited in claim 9, wherein said step of controlling a regenerative current comprises limiting said regenerative current to maintain said voltage at said power converter below a predetermined threshold.

12. A method as recited in claim 10, wherein said step of controlling a regenerative current comprises limiting said regenerative current to maintain said voltage at said power converter below a predetermined threshold.

* * * * *